United States Patent [19]

Hirai et al.

[11] Patent Number: 4,990,311
[45] Date of Patent: * Feb. 5, 1991

[54] DEODORIZING APPARATUS AND METHOD

[75] Inventors: Yoichi Hirai, Ohbu; Toshikazu Ito, Nagoya, both of Japan

[73] Assignee: Tohkai Kogyo Co., Ltd., Aichi, Japan

[*] Notice: The portion of the term of this patent subsequent to Jun. 27, 2006 has been disclaimed.

[21] Appl. No.: 138,853

[22] Filed: Dec. 29, 1987

[30] Foreign Application Priority Data

Mar. 20, 1987 [JP] Japan .................................. 62-64064

[51] Int. Cl.$^5$ .............................................. B01J 19/08
[52] U.S. Cl. .................................... 422/4; 422/5; 422/24; 422/120; 422/186.08; 422/186.3; 204/176; 250/431; 250/435
[58] Field of Search ............. 422/4.5, 24, 120, 186.08, 422/186.3; 204/176; 250/431, 435

[56] References Cited

U.S. PATENT DOCUMENTS

| | | | |
|---|---|---|---|
| 3,744,216 | 7/1973 | Halloran | 422/24 X |
| 3,745,750 | 7/1973 | Arff | 422/24 X |
| 3,750,370 | 8/1973 | Brauss et al. | 422/24 X |
| 3,757,495 | 9/1973 | Sievers | 422/24 X |
| 4,210,429 | 7/1980 | Golstein | 422/24 X |
| 4,309,388 | 1/1982 | Tenney et al. | 422/24 X |
| 4,551,304 | 11/1985 | Holter et al. | 422/4 |
| 4,694,179 | 9/1987 | Lew et al. | 422/24 X |
| 4,766,321 | 8/1988 | Lew et al. | 422/24 X |
| 4,786,812 | 11/1988 | Humphreys | 422/24 X |
| 4,842,829 | 6/1989 | Hirai et al. | 422/5 X |

Primary Examiner—Robert J. Warden
Assistant Examiner—Lynn M. Kummert
Attorney, Agent, or Firm—Dann, Dorfman, Herrell and Skillman

[57] ABSTRACT

An apparatus and method for deodorizing a gas mixture including air and a malodorous substance having a flow passage for the gas mixture and a fan for inducing air flow in a predetermined direction through the passage. An ultraviolet lamp for generating uv rays below a critical wavelength is in the flow passage for generating ozone from the air in the gas mixture. An ozone-decomposing catalyst layer is in the passage for contacting the gas mixture, and an ozone-decomposing ultraviolet lamp for generating uv rays above critical wavelength is positioned to irradiate the layer directly. The intensity of the radiation of the two layers is controlled to avoid the discharge of ozone from the downstream end of the passage.

17 Claims, 4 Drawing Sheets

DEODORIZING APPARATUS AND METHOD

INDUSTRIAL FIELD

This invention relates to a novel deodorizing apparatus and method which is capable of decomposing malodorous substances through oxidation by effective use of ozone.

BACKGROUND OF THE INVENTION

Ozone is produced from oxygen by silent discharge or by the action of ultraviolet rays below a critical wavelength. Above all, ozone is produced by irradiating oxygen with an ultraviolet ray of a wavelength smaller than 200 nm, preferably of a wavelength of 185 nm, according to the following formulas (I) and (II).

$$O_2 + h\nu \rightarrow 2O \quad (I)$$

$$O_2 + O + M_1 \rightarrow O_3 + M_1 \quad (II)$$

wherein $h\nu$ is an ultraviolet ray and $M_1$ is a third substance such as nitrogen.

For deodorization, there has thus far been adopted a method of decomposing malodorous substances in exhaust gases by oxidation with the produced ozone and treating unreacted ozone with activated carbon in consideration of its toxicity to human bodies. In order to improve the efficiency of deodorization by ozone, it has been known to use oxygen of nascent state with extremely strong oxidizing power, which is produced by forcibly decomposing ozone. The means for producing the nascent state oxygen from ozone include catalytic methods, ultraviolet (above a critical wavelength) ray methods, pyrolytic methods, radioactive ray or electron beam irradiation methods and other methods using supersonic or high frequency waves. As deodorizing devices using the radioactive ray or electron beam irradiation or supersonic or high frequency waves are relatively large in scale, it appears practically advantageous to use a catalyst or ultraviolet ray for deodorizers of small sizes which are intended for home use.

The decomposition of ozone by a catalyst is generally expressed by the following formula (III).

$$O_3 - M_2 \leftarrow O_2 + (O) + M_2 \quad (III)$$

wherein $M_2$ is a catalyst, (O) is oxygen in nascent state.

The decomposition of ozone by ultraviolet ray is generally expressed by the following formula (IV)

$$O_3 - h\nu \leftarrow O_2 + (O) \quad (IV)$$

In the catalytic ozone decomposition, however, it has been difficult to maintain the initial high decomposition capacity since the catalyst life is shortened as it is rapidly deteriorated due to oxidation reaction of the catalyst itself as a result of the ozone decomposition. In case of ozone decomposition by an ultraviolet ray with a wavelength of 254 nm, the decomposition capacity is impractically low as compared with the catalytic method.

SUMMARY OF THE INVENTION

Under the foregoing circumstances, the present invention contemplates providing a deodorizing apparatus with a high decomposition capacity and a method which can solve the above-mentioned problems in the deodorization of malodorous substances with use of oxygen of nascent state which has high oxidation power.

In accordance with the present invention, the aforementioned problems are solved by the provision of a novel deodorizing apparatus, which essentially includes means for inducing air flows in a predetermined direction; an ozone-generating ultraviolet lamp; an air-permeable ozone-decomposing catalyst layer; and an ozone-decomposing ultraviolet lamp; the ozone-decomposing catalyst layer being located in a position where the catalyst layer is directly irradiated by the ozone-decomposing ultraviolet lamp.

DESCRIPTION OF THE PREFERRED EMBODIMENTS

Figure 1:
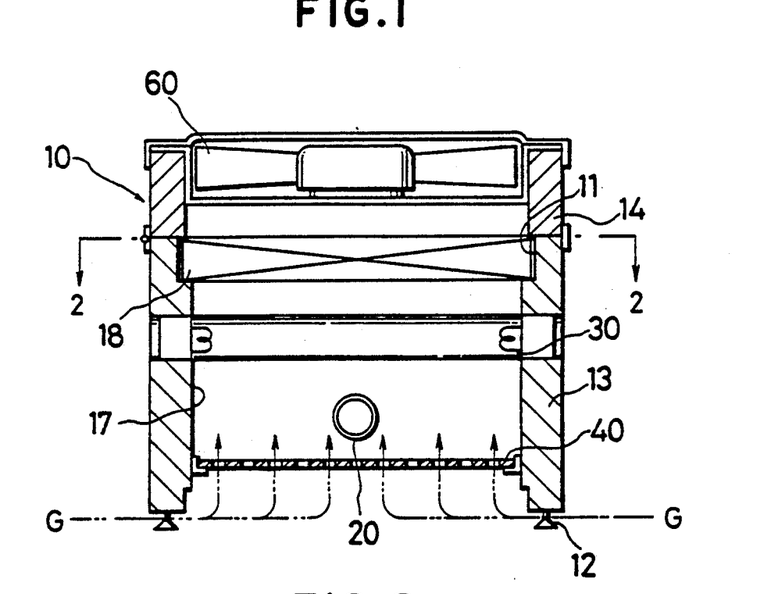
FIG. 1 is a vertical section of an embodiment of deodorizing apparatus made according to the invention.
Figure 2:
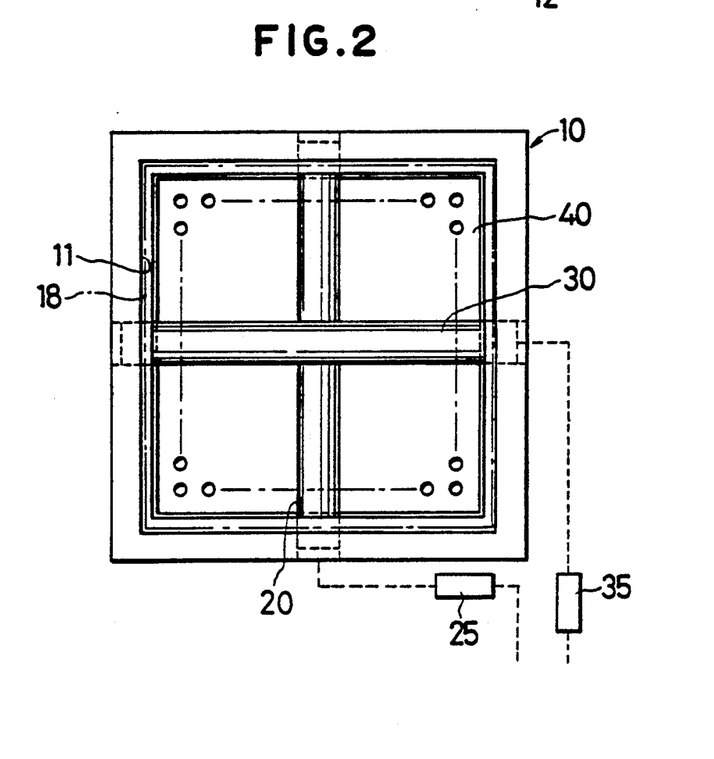
FIG. 2 is a transverse sectional view taken on line 2—2 of FIG. 1 with the ozone-decomposing layer removed as indicated by the broken lines.

An example of a deodorizing apparatus made according to the present invention is shown in FIGS. 1 and 2.

In FIG. 1 and FIG. 2, the reference character G denotes a gas mixture of a malodorous substance and air and the arrow indicates the flow direction of the gas mixture. The deodorizing apparatus 10 includes a lower 13 and an upper housing 14 on support legs 12. The housings are hollow, and in the present instance are of sguare configuration to provide an upright flow passage 17 therethrough. Upstream in the flow passage 17, in the flow direction of the gas mixture G, the deodorizing apparatus is provided with a diffuser plate 40 of punched metal to provide a uniform distribution and rectification of the gas mixture of the malodorous substance and air throughout the entire cross section of the flow passage 17. Within the flow passage 17 there is an ozone-generating ultraviolet lamp 20, generating uv rays below a critical wavelength for producing ozone from oxygen in the air, an ozone-decomposing ultraviolet lamp 30 generating uv rays above a critical wavelength for producing nascent and molecular oxygen from the oxygen, a catalyst layer support 11 for mounting thereon an air-permeable ozone-decomposing catalyst layer, and an axial flow fan 60 employed as means for inducing air streams in a predetermined direction through the passage 17.

At the upper end of the lower housing 13, the wall of the housing is recessed at 11 to provide a support for an air-permeable ozone-decomposing catalyst layer 18 which can be mounted on the support 11 in a position where the catalyst layer is directly irradiated by the ozone-decomposing ultraviolet lamp 30. In the preferred embodiment, the lamps 20 and 30 comprise elongated tubes spanning across the flow passages 17 between and generally parallel to the diffuser plate 40 and the layer 17, the tubes being oriented perpendicular to each as shown.

The air-permeable ozone-decomposing catalyst layer 18 consists of, for example, a transition metal oxide, like nickel oxide, a noble metal, like platinum, or a mixture of a transition metal oxide and a noble metal, which is supported on a carrier of cordierite or the like. In the present embodiment, a nickel oxide-base catalyst layer in the form of an air-permeable filter is used.

The upper housing 14 is releasably attached to the upper end of the housing 13 to afford ready access to the layer 18 on the support 11 for servicing and/or removal and replacement.

The ozone-generating ultraviolet lamp 20 generates an ultraviolet ray of a wavelength smaller than 200 nm, mainly of a wavelength of 185 nm. On the other hand, the ozone-decomposing ultraviolet lamp 30 mainly generates an ultraviolet ray of a wavelength of 254 nm. These two kinds of ultraviolet lamps 20 and 30 each include means for adjusting their intensity as indicated at 25 and 35 in FIG. 2.

OPERATION

A flow of the gas mixture G which consists of a malodorous substance and air is generated by an air flow generating means, in the present case the fan 60 at the upper end of the housing 14. Ozone is produced by the ozone-generating ultraviolet lamp 20 from oxygen in the air to convert the gas mixture into an ozone-prevailing atmosphere. Thereafter, the ozone which is produced by the lamp 20 is decomposed by the catalyst layer 17 and the ozone-decomposing ultraviolet lamp 30 to generate nascent state oxygen with extremely strong oxidizing power for oxidation/decomposition of the malodorous substance.

As the ozone decomposition proceeds, the above-mentioned catalyst gradually loses its decomposing capacity due to a deteriorating reaction of the catalyst itself. However, according to the present invention the ozone-decomposing ultraviolet lamp 30 not only reduces the ozone to reduce the burden on the catalyst in decomposing the ozone, but also generates, by an ultraviolet ray (especially of 254 nm wavelength), nascent state oxygen which reacts inversely to the deteriorating reaction of the catalyst, thereby reactivating the catalyst and preventing its deterioration.

Thus, the deodorizing apparatus according to the present invention succeeds in advantageously incorporating the synergistic effects of the catalytic and ultraviolet decomposition systems which have been found to be insufficient in function when applied separately.

The illustrated deodorizing apparatus 10 operates as follows:

The gas mixture G which is suctioned into the deodorizing apparatus 10 through the plate 40 by the axial flow fan 60 produces ozone as it is irradiated by the ozone-generating ultraviolet lamp 20. The gas mixture G which now consists of ozone and a malodorous substance is then irradiated by the ozone-decomposing ultraviolet lamp 30 and admitted into the ozone-decomposing catalyst layer 17 which is also irradiated by the ozone-decomposing ultraviolet lamp 30. As a result, the ozone is forcibly decomposed, thereby generating nascent state oxygen with extremely strong oxidizing power to decompose the malodorous substance in the gas mixture G.

The ozone concentration in the gas mixture which is discharged from this operation is preferably smaller than 0.1 ppm from the standpoint of safety. For this purpose, the intensity of the ozone-generating ultraviolet lamp 20 of the deodorizer 10 is adjusted so as to maintain the ozone concentration in the gas mixture to a value smaller than 0.1 ppm.

It is to be understood that the foregoing embodiment of the deodorizing apparatus has been shown and described by way of example, and, needless to say, it should not be construed as limitative of the present invention.

EXPERIMENTAL EXAMPLES

The present inventors conducted the following experiments in order to confirm the effects of the deodorizing apparatus as disclosed in the foregoing embodiment, in which the catalyst deterioration was accelerated by the use of ozone in a high concentration of 300 ppm in the experiments for observation of the catalyst deterioration as well as in the experiments for observation of the action of the 254 nm ultraviolet ray on the catalyst.

Experiment I

There was firstly conducted an experiment for measuring the variations in ozone decomposing capacity of the catalyst layer.

Figure 3:
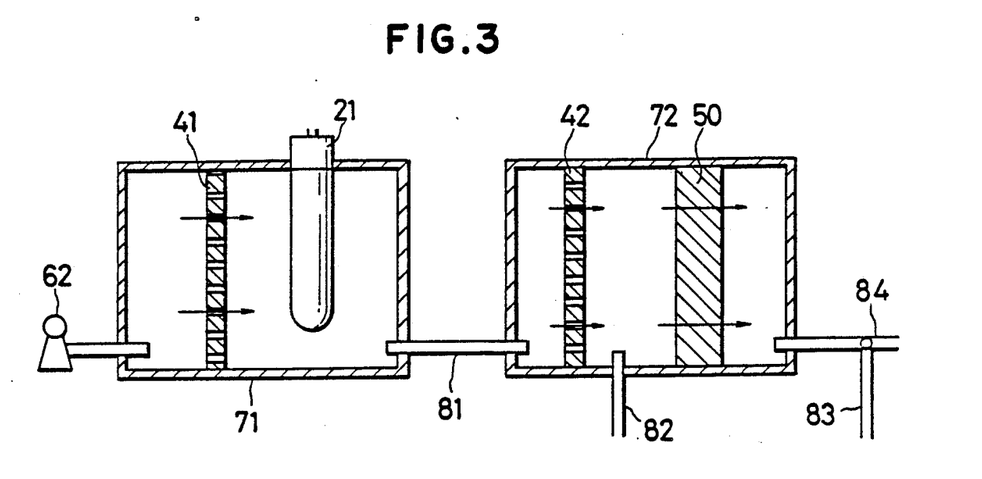
FIG. 3 is a diagrammatic illustration of the procedures used in Experiment I.

Shown in FIG. 3 is an experimental apparatus for forcibly deteriorating the ozone-decomposing catalyst layer by means of high concentration ozone, in which indicated at 50 is an air-permeable ozone decomposing catalyst layer for forcibly decomposing ozone; at 21 is an ozone-generating ultraviolet lamp for generating ozone from oxygen by the action of the ultraviolet ray; and at 41 and 42 are diffuser plates of punched metal. A fan 62 is connected to an ozone generating chamber 71 to send air thereinto. The air which has been sent into the ozone generating chamber 71 by the fan 62 is formed into rectified or diffused streams by the diffuser plate 41 and is irradiated by the ozone-generating ultraviolet lamp 21 to generate ozone. The air which contains the generated ozone flows into an ozone-decomposing chamber 72 through a connecting duct 81, in which the ozone-containing air is formed into rectified streams by the rectifier plate 42 and into contact with the ozone-decomposing catalyst layer 50. Indicated at 82 is a sampling pipe upstream of the ozone-decomposing catalyst layer 50; at 83 is a sampling pipe downstream of the ozone-decomposing catalyst layer 50; and at 84 a discharge pipe.

In this experimental apparatus, the ozone-decomposing catalyst layer 50 employed as a carrier a ceramic filter with a three-dimensional structure of cordierite, supporting thereon a nickel oxide-base catalyst, and air was fed by the fan 62 at a volumetric flow rate of 2 liters/min.

Samples (hereinafter S82 and S83) were taken through the sampling pipes 82 and 83 in an initial stage of the experiment, after a lapse of 50 hours and after a lapse of 100 hours, respectively, to measure the ozone concentration.

In this experiment, the intensity of the ozone-generating ultraviolet lamp 21 was adjusted to generate ozone in a concentration of 300 ppm.

The results of the experiments are shown in Table 1 below.

TABLE 1

|  | S 82 (ppm) | S 83 (ppm) |
|---|---|---|
| Initial stage | 300 | 1.0 |
| 50 hours later | 300 | 46 |

TABLE 1-continued

| | S 82 (ppm) | S 83 (ppm) |
|---|---|---|
| 100 hours later | 300 | 98 |

From these experimental results, it was confirmed that the ozone-decomposing capacity of the catalyst deteriorated with time.

Experiment II

Next, a comparative experiment was conducted to examine the deodorizing capacity of samples obtained from the layer 50 in the foregoing experiment, namely, a sample I of the ozone-decomposing catalyst layer in the initial stage, a sample II of the ozone-decomposing catalyst layer after a time lapse of 50 hours, and a sample III of the ozone-decomposing catalyst layer after a time lapse of 100 hours.

Figure 4:
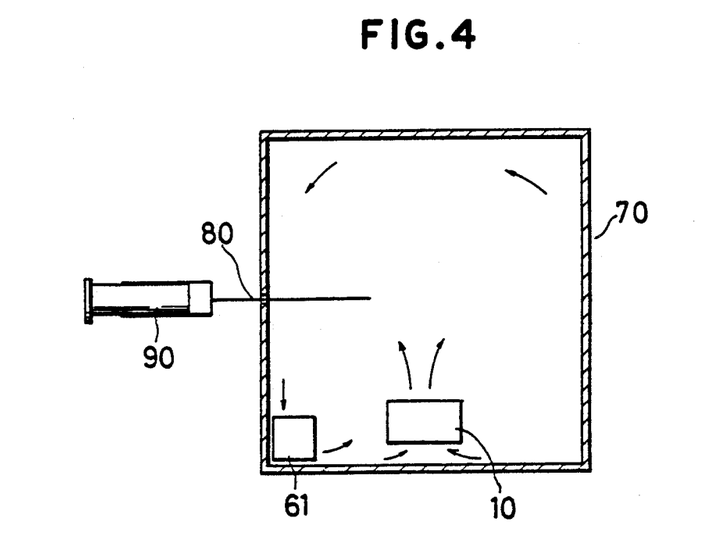
FIG. 4 is a diagrammatic illustration of the procedures used in Experiment II.

FIG 4 illustrates an apparatus which was used in the aforementioned comparative experiment. A cross-flow fan 61 is provided within a hermetically sealed chamber 70 of 216 litres in volume. The sealed chamber 70 is provided with a measurement hole 80 to be used for gas injection and sampling.

The sample I was mounted in the place of layer 17 on the ozone-decomposing catalyst layer support 11 of the deodorizing apparatus 10 of FIGs. 1 and 2 and the apparatus was placed in the sealed chamber 70. Turning on the cross-flow fan 61, hydrogen sulfide was slowly injected by means of an injector 90 while measuring the gas through a gas detector tube (not shown) to hold the hydrogen sulfide concentration at about 100 pp. Thereafter, the ozone-generating ultraviolet lamp 20 and ozone-decomposing ultraviolet lamp 30 of the deodorizer 10 were energized, and at the same time the axial flow fan 60 was started. At predetermined time intervals, the hydrogen sulfide concentration in the sealed chamber 70 was measured by the gas detector tube.

The same experimental procedures were repeated for the samples II and III.

The results of experiments on the samples I to III are shown in Tables II to IV, respectively.

Figure 6:
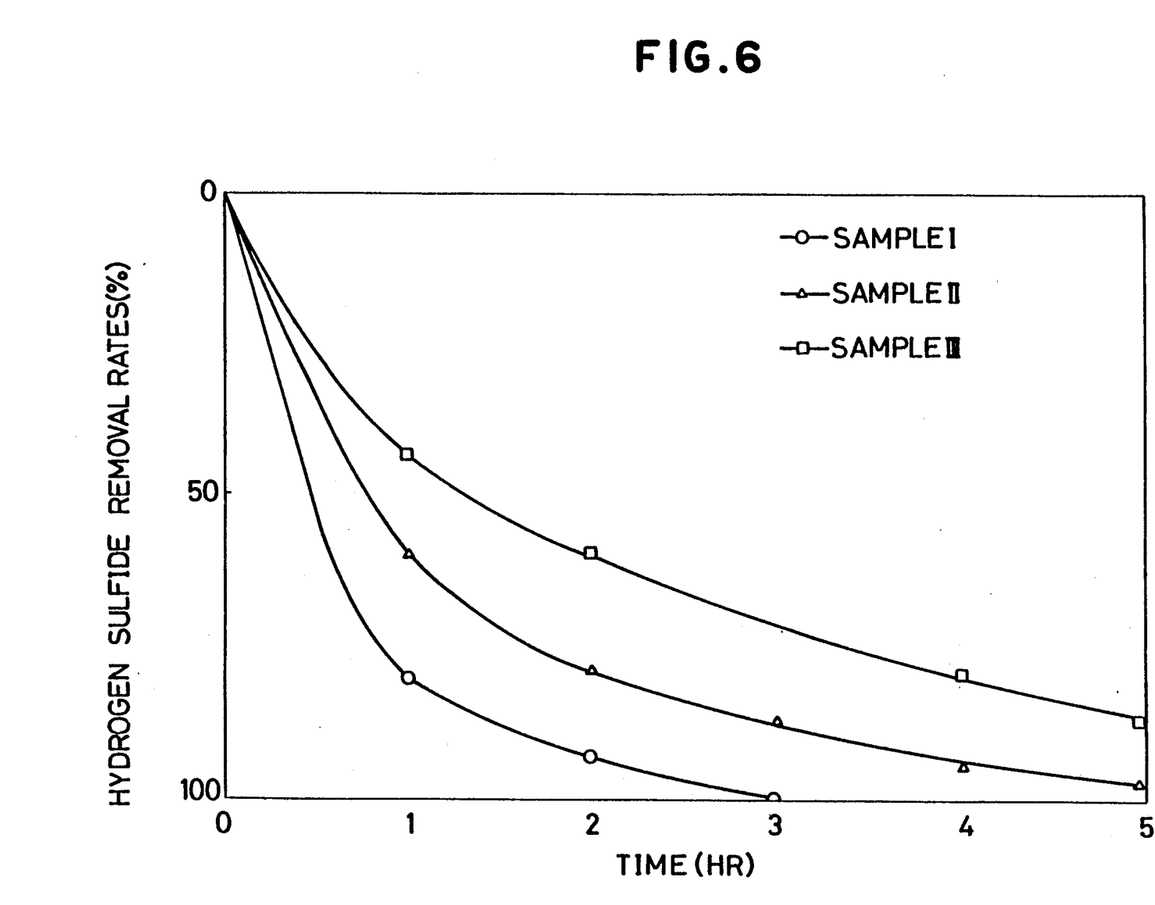
FIG. 6 is a diagram of hydrogen sulfide removal rates determined in Experiment II.

FIG. 6 shows the hydrogen sulfide removal rates which were obtained from the results of these experiments.

TABLE II

| | (Sample I) | |
|---|---|---|
| Time (hr) | $H_2S$ Concentr'n (ppm) | Removal Rate (%) |
| 0 | 112 | 0 |
| 1 | 21 | 81 |
| 2 | 7 | 94 |
| 3 | 0 | 100 |

TABLE III

| | (Sample II) | |
|---|---|---|
| Time (hr) | $H_2S$ Concentr'n (ppm) | Removal Rate (%) |
| 0 | 98 | 0 |
| 1 | 38 | 61 |
| 2 | 21 | 79 |
| 3 | 12 | 88 |
| 4 | 5 | 95 |
| 5 | 1 | 99 |

TABLE IV

| | (Sample III) | |
|---|---|---|
| Time (hr) | $H_2S$ Concentr'n (ppm) | Removal Rate (%) |
| 0 | 108 | 0 |

TABLE IV-continued

| | (Sample III) | |
|---|---|---|
| Time (hr) | $H_2S$ Concentr'n (ppm) | Removal Rate (%) |
| 1 | 60 | 44 |
| 2 | 43 | 60 |
| 3 | 28 | 74 |
| 4 | 22 | 80 |
| 5 | 14 | 87 |

It was confirmed from the results of the foregoing experiments that the capacity for decomposing the malodorous substance dropped with deterioration in the ozone decomposing capacity of the catalyst. Accordingly, in order to carry out the deodorizing operation effectively, it is necessary to prevent the deterioration of the ozone-decomposing catalyst layer which occurs as a result of ozone decomposition.

Experiment III

The following experiment was conducted next to examine the effects of the ultraviolet ray of 254 nm in wavelength which acts as a means for preventing the catalyst deterioration in the ozone decomposition.

Figure 5:
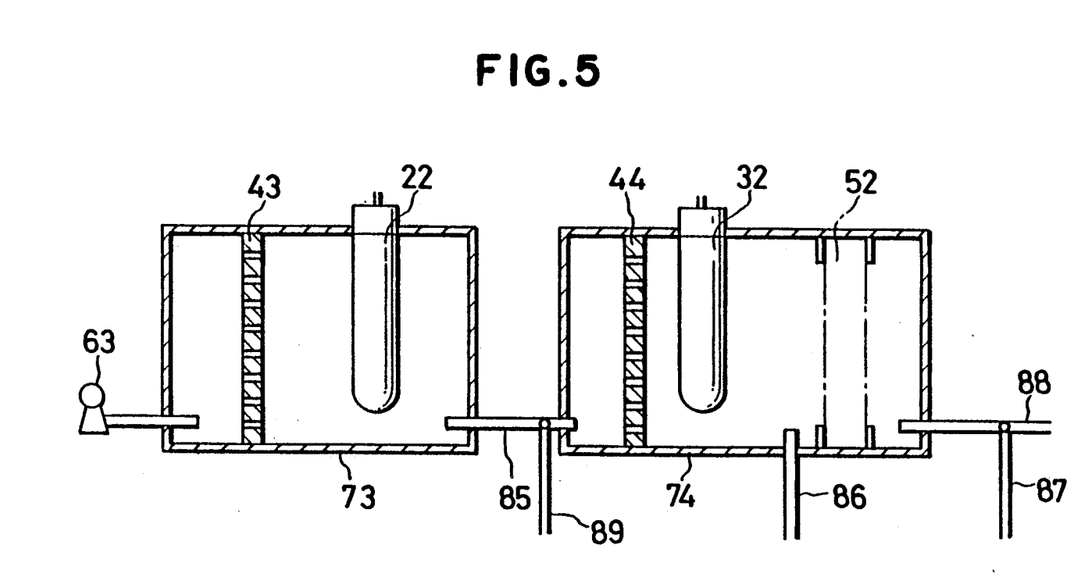
FIG. 5 is a diagrammatic illustration of the procedures used in Experiment III.

FIG. 5 shows the apparatus employed for experiment III, which has a fan 63 attached to one side of an ozone-generating chamber 73 for sending air thereinto. Provided within the ozone-generating chamber 73 are a diffuser plate 43 of punched metal and an ozone-generating ultraviolet lamp 22. Provided in an ozone-decomposing chamber 74 are a diffuser plate 44 of punched metal, an ozone-decomposing ultraviolet lamp 32 adapted to generate an ultraviolet ray mainly of 254 nm wavelength, and an ozone-decomposing catalyst holder 52 located in a position which is directly irradiated by the ozone-decomposing ultraviolet lamp. The ozone-decomposing chamber 74 is communicated with the ozone-generating chamber 73 through a connecting duct 85. Denoted at 86 is a sampling pipe upstream of the ozone-decomposing catalyst layer (not mounted in FIG. 5); at 87 is a sampling pipe downstream of the ozone-decomposing catalyst layer; at 88 is a discharge pipe; and 89 is a sampling pipe downstream of the ozone-generating chamber 73, and upstream of the chamber 74.

Firstly, without mounting the catalyst on the ozone-decomposing catalyst holder 52, air was fed by the fan 62 at a volumetric flow rate of 2 liters/min, and simultaneously the ozone-generating ultraviolet lamp 22 was turned on, while adjusting the ozone concentration to 300 ppm. Then, the ozone-decomposing ultraviolet lamp 32 was turned in, measuring the ozone decomposing capacity of the 254 nm wavelength ultraviolet ray alone from the ozone concentration. The results are shown in Table V below.

TABLE V

| | Downstream of ozone-Generating Chamber (at 89) | Downstream of Ozone-Decomposing Chamber (at 87) |
|---|---|---|
| Ozone Concentr'n (ppm) | 300 | 180 |

Thereafter, a fresh ozone-decomposing catalyst layer (similar to Sample I) was fitted in the catalyst holder 52, measuring the ozone decomposing capacity on the basis of the ozone concentration in an initial stage and after a time lapse of 100 hours with the ozone-decomposing ultraviolet lamp 32 in both on- and off-states. The results are shown in Table VI below.

TABLE VI

| | OZONE CONCENTRATION (ppm) | | |
| --- | --- | --- | --- |
| | Upstream of | Downstream of Catalyst Layer (at 87) | |
| Lamp 32 | Catalyst Layer (at 89) | Initial Stage of Measurement | 100 hrs later |
| ON | 300 | 1.0 | 34 |
| OFF | 300 | 1.2 | 103 |

As a result of this experiment, it has been confirmed that the 254 nm wavelength ultraviolet ray acts not only to reduce the amount of ozone to be treated with the catalyst by decomposing ozone but also to reactivate the catalyst with nascent state oxygen which is produced by the ultraviolet rays, thereby preventing deterioration of the catalyst.

EFFECTS OF THE INVENTION

According to the present invention, in the deodorization of malodorous substances with nascent state oxygen which occurs as a result of forced decomposition of ozone by an ultraviolet ray, it becomes possible to prevent deterioration of the ozone-decomposing catalyst and conseguently to maintain the deodorizing capacity effectively by irradiating the ozone-decomposing catalyst layer with an ultraviolet ray (especially of 254 nm in wavelength) from an ozone-decomposing ultraviolet lamp in an ozone-prevailing atmosphere to reactive the ozone-decomposing capacity of the catalyst.

With regard to the action of the ultraviolet ray on malodorous substances (e.g. sulfides, ammonia, etc.), the photo energization by the 185 nm wavelength ultraviolet ray decomposes the malodorous substances or renders them easily decomposable, so that it has an effect of promoting the oxidative decomposition of the substances by nascent state oxygen in the next stage. Further, since the ozone-generating ultraviolet lamp can generate a 254 nm wavelength ultraviolet ray simultaneously with the 185 nm wavelength ultraviolet ray, the deodorizing capacity can be improved all the more by providing an ozone-generating ultraviolet lamp also in a position which it can directly irradiate the ozone-decomposing catalyst layer.

With regard to sterilization, the 254 nm wavelength ultraviolet ray has an excellent sterilizing effect.

While a preferred embodiment of the apparatus of the present invention has been illustrated and described, changes and modifications may be made therein and thereto within the scope of the present invention defined in appended claims.

We claim:

1. A deodorizing apparatus for a gas mixture including air and a malodorous substance, comprising means defining a flow passage for the gas mixture having entrance and exit ends, means in said apparatus for inducing air flow in a predetermined direction through said passage, an ultraviolet lamp positioned in said apparatus to irradiate said passage adjacent in its entrance end for generating uv rays in said flow passage for generating ozone from the air in the gas mixture entering said passage, an ozone-decomposing catalyst layer positioned in said passage downstream from said entrance end for contacting the ozone-containing gas mixture flowing through said passage, and an ozone-decomposing ultraviolet lamp in said apparatus for generating uv rays positioned to irradiate said layer directly.

2. The deodorizing apparatus of claim 1, wherein said ozone-generating ultraviolet lamp is positioned to also directly irradiate said layer.

3. A deodorizing apparatus according to claim 1 including a diffuser means at the entrance end of said passage to uniformly distribute the gas mixture throughout the cross-section of said passage.

4. A deodorizing apparatus according to claim 3, wherein said layer is air-permeable and coextensive with and disposed across the cross-section of said passage at the exit end thereof.

5. A deodorizing apparatus according to claim 4, wherein said lamps are disposed within said passage between said diffuser means and said layer.

6. A deodorizing apparatus according to claim 5, wherein each of said ultraviolet lamps comprises an elongated tube spanning across said passage, said tubes being disposed perpendicular to each other.

7. Apparatus according to claim 4, wherein said flow-inducing means comprises an axial fan mounted in said apparatus downstream of said layer at the exit end of said passage.

8. A deodorizing apparatus according to claim 1, including control means for each of said lamps for adjusting the intensity thereof.

9. A deodorizing apparatus according to claim 1, including a two-part housing defining said flow passage, wherein said layer is disposed at the junction between said two parts, said parts being removably attached to afford displacement thereof for access to said layer for servicing.

10. Apparatus according to claim 1, wherein each of said lamps comprises an elongated tube disposed within said passage and spanning thereacross, said ozone-generating tube being disposed perpendicular to said ozone-decomposing tube.

11. A method of deodorizing a gas mixture including air and a malodorous substance, comprising the steps of providing the flow passage having entrance and exit ends for the gas mixture and inducing air flow in a predetermined direction through said passage, generating ultraviolet rays below a critical wavelength in one part of said flow passage adjacent the entrance end for generating ozone from the air in said gas mixture, providing an ozone-decomposing catalyst layer downstream from said one part of said passage for contacting the gas mixture, generating ultraviolet rays above a critical wavelength to decompose ozone in said passage downstream from said one part, and irradiating said layer with said ultraviolet rays above a critical wavelength.

12. The deodorizing method of claim 11, wherein said ultraviolet rays below a critical wavelength also directly irradiate said layer.

13. A deodorizing method according to claim 11 including the step of uniformly distributing the gas mixture throughout the cross-section of said passage by a diffuser means at the entrance end of said flow passage.

14. A deodorizing method according to claim 13, wherein said layer is air-permeable and including the step of disposing said layer coextensive with and across the cross-section of said passage at the exit end thereof.

15. A deodorizing method according to claim 14, wherein said rays are irradiated within said passage between said diffuser means and said layer.

16. A deodorizing method according to claim 11, including the step of adjusting the intensity of said ozone-decomposing rays to maintain the ozone-concentration in the gas mixture downstream of said layer less than 0.1 ppm.

17. A deodorizing method according to claim 11 wherein said flow-inducing step is accomplished by sucking the gas mixture through said flow passage by flow-inducing means at the exit end thereof.

* * * * *

UNITED STATES PATENT AND TRADEMARK OFFICE
CERTIFICATE OF CORRECTION

PATENT NO. : 4,990,311

DATED : February 5, 1991

INVENTOR(S) : Yoichi HIrai et al.

It is certified that error appears in the above-identified patent and that said Letters Patent is hereby corrected as shown below:

Column 1, line 45, Formula III should be:

--$O_3 + M_2 \rightarrow O_2 + (O) + M_2$--;

Column 1, line 50, Formula IV should be:

--$O_3 + h\nu \rightarrow O_2 + (O)$--;

Column 7, line 27, "conseguently" should be --consequently--;

Column 7, line 62, after "adjacent", delete "in".

Signed and Sealed this

Second Day of June, 1992

Attest:

DOUGLAS B. COMER

*Attesting Officer*   *Acting Commissioner of Patents and Trademarks*